(12) United States Patent
Orr et al.

(10) Patent No.: US 7,015,976 B1
(45) Date of Patent: Mar. 21, 2006

(54) AUTOMATIC PANNING OF DIGITAL CONTENT WHILE ZOOMED

(75) Inventors: Stephen J. Orr, Markham (CA); Godfrey W. Cheng, Mississauga (CA)

(73) Assignee: ATI International SRL, Christchurch (BB)

( * ) Notice: Subject to any disclaimer, the term of this patent is extended or adjusted under 35 U.S.C. 154(b) by 363 days.

(21) Appl. No.: 09/633,463

(22) Filed: Aug. 7, 2000

(51) Int. Cl.
*H04N 5/232* (2006.01)

(52) U.S. Cl. ..................................... 348/578
(58) Field of Classification Search ............... 348/578, 348/239, 511, 240.99, 240.1, 240.2, 240.3, 348/725, 581, 208.99, 208.1, 208.3, 208.4, 348/208.13, 208.14, 169
See application file for complete search history.

(56) References Cited

U.S. PATENT DOCUMENTS

| | | | | |
|---|---|---|---|---|
| 5,506,912 A | * | 4/1996 | Nagasaki et al. | 382/103 |
| 5,552,823 A | * | 9/1996 | Kageyama | 348/155 |
| 5,680,152 A | * | 10/1997 | Bricklin | 345/419 |
| 5,923,365 A | * | 7/1999 | Tamir et al. | 348/169 |
| 6,031,568 A | * | 2/2000 | Wakitani | 348/169 |
| 6,115,067 A | * | 9/2000 | Koyama | 348/358 |
| 6,141,041 A | * | 10/2000 | Carlbom et al. | 348/169 |
| 6,188,432 B1 | * | 2/2001 | Ejima | 348/240 |
| 6,211,912 B1 | * | 4/2001 | Shahraray | 348/228.1 |
| 6,362,850 B1 | * | 3/2002 | Alsing et al. | 348/239 |
| 6,393,054 B1 | * | 5/2002 | Altunbasak et al. | 375/240 |
| 6,507,366 B1 | * | 1/2003 | Lee | 348/352 |

* cited by examiner

*Primary Examiner*—Paulos M. Natnael
(74) *Attorney, Agent, or Firm*—Vedder, Price, Kaufman & Kammholz, P.C.

(57) ABSTRACT

The digital television system that has a zoom module. When the digital television system is in a zoom mode, the zoom module receives a full frame, and displays the zoom frame that includes only a portion of the full frame. The zoom module determines a relationship between the zoom frame and the full frame. The zoom module also identifies an object within a zoom frame, and a motion vector of the object with respect to a background of the zoom frame. As the object moves within the zoom frame, the zoom module adjusts relationship between the zoom frame and the full frame so that the object remains within the zoom frame.

22 Claims, 4 Drawing Sheets

AUTOMATIC PANNING OF DIGITAL CONTENT WHILE ZOOMED

FIELD OF THE INVENTION

The invention relates generally to digital video application and more particularly to automatic panning of digital content while zoomed.

BACKGROUND OF THE INVENTION

Digital televisions receive and display images that are broadcast as digital signals, for example as a stream of MPEG2 data. The digital televisions receive the digital signals on a digital medium, and place the MPEG2 data into a video buffer, much as a computer receives and stores video or graphics information.

Digital televisions may include many of the features of prior generations of analog televisions, including the ability to "zoom." Zooming allows a person watching television to magnify a selected portion of the television screen. The selected portion is a "zoom frame." The television displays the zoom frame, magnifying it to cover the entire screen, rather than the entire MPEG2 frames (i.e., the "full frames") as received by the television.

Internally, the television defines the zoom frame in terms of its position and size within the full frame. Unfortunately, as persons and things move about the screen, they enter and leave the selected portion defined as the zoom frame. For example, if the full frame belongs to a motion picture in which a person walks from the left edge of the screen to the right edge of the screen, the person will walk through the zoom frame. Panning of the camera exacerbates the problem. Panning is a cinematographic technique in which a cameraman pivots the camera to show a scene that is too large to be shown conveniently in a single frame. When a camera is panned, the image appears to slide from one edge of the full frame to the other edge of the full frame. Accordingly, unless the zoom portion is moved with respect to the full frame, the zoom portion includes images that slide from one edge of the zoom frame to the other.

DETAILED DESCRIPTION OF A PREFERRED EMBODIMENT OF THE INVENTION

The present invention includes, among various aspects, a digital television system that has a zoom module. When the digital television system is in a zoom mode, the zoom module receives a full frame, and displays zoom frame that includes only a portion of the full frame. The zoom module determines a relationship between the zoom frame and the full frame. The zoom module also identifies an object within a zoom frame, and a motion vector of the object with respect to a background of the zoom frame. As the object moves within the zoom frame, the zoom module adjusts relationship between the zoom frame and the full frame so that the object remains within the zoom frame.

Figure 1:
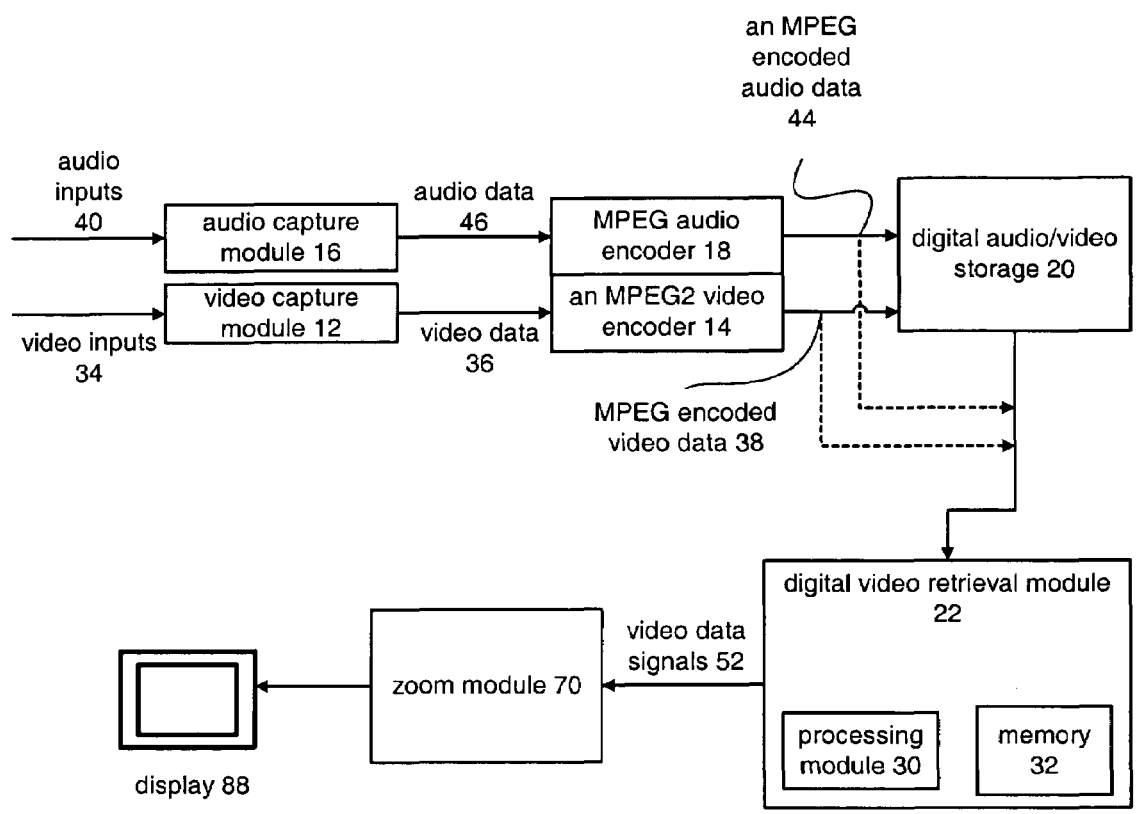
FIG. 1 shows a digital television system that includes a video capture module 12, an MPEG2 video encoder 14, digital audio/video storage 20, a digital video retrieval module 22, a zoom module 70, and a display 88.
Figure 2:
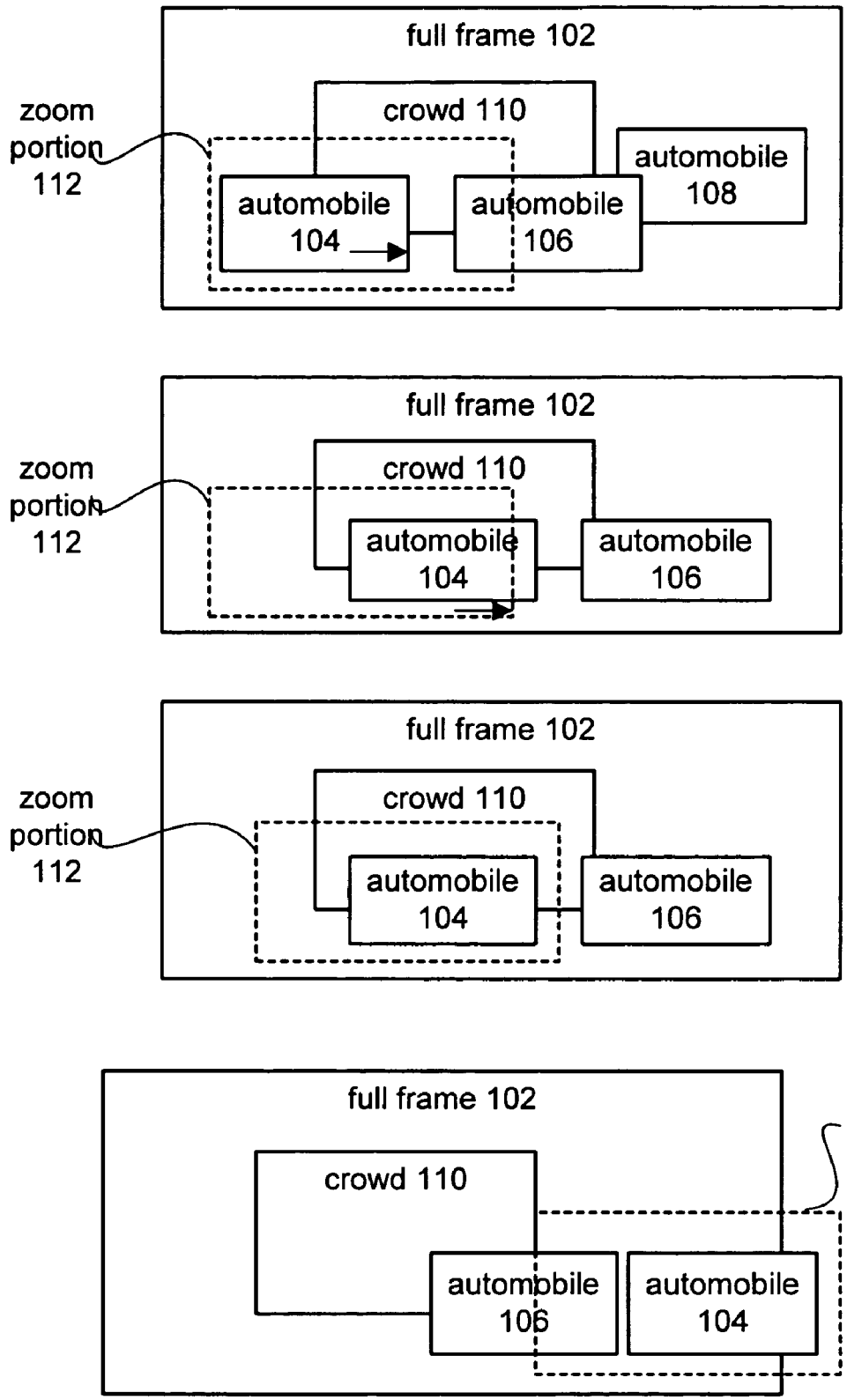
FIG. 2 shows a full frame 102 and a zoom frame 112 that are examples of one situation that might arise during operation of the digital television system of FIG. 1.
Figure 3:
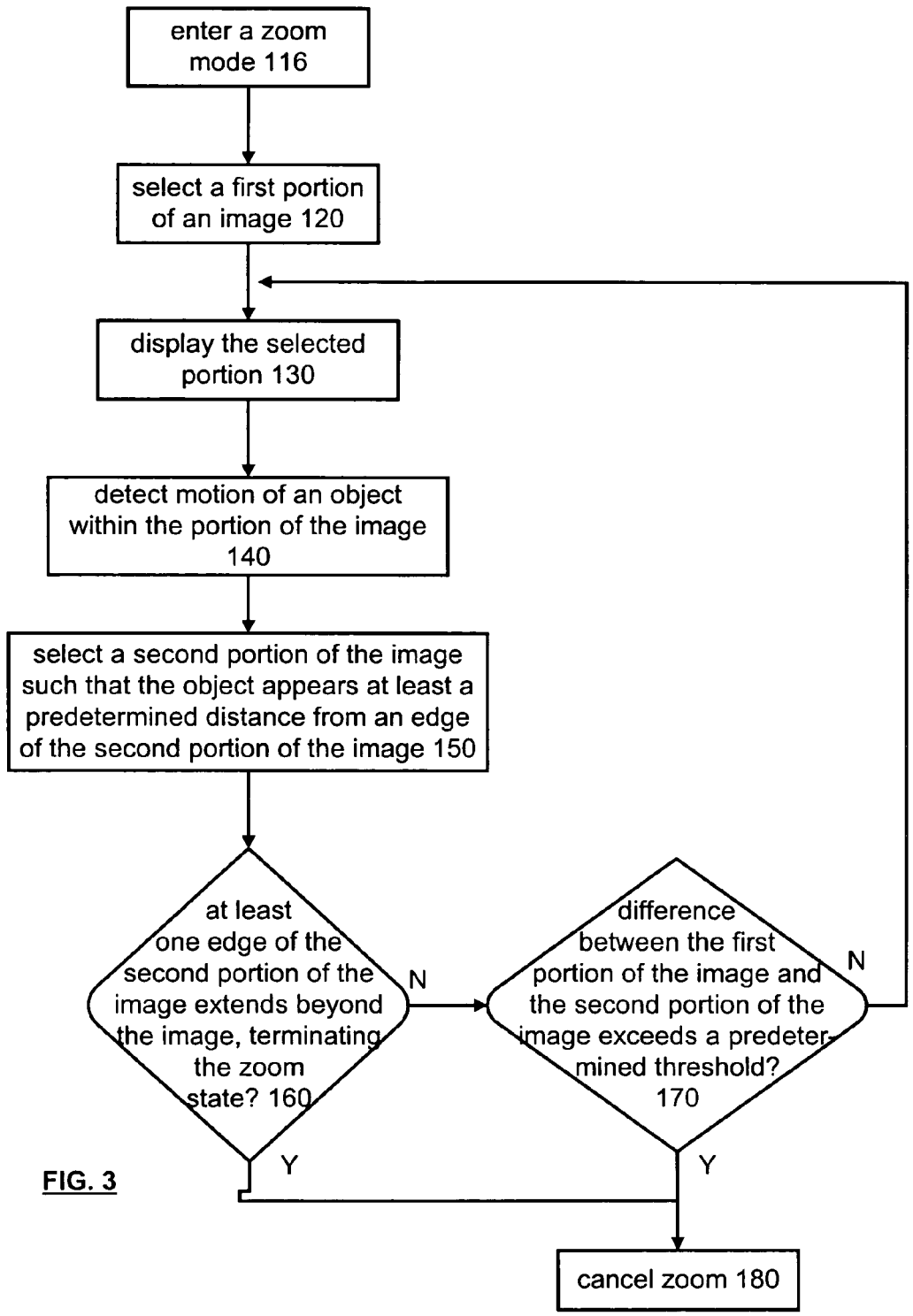
FIG. 3 shows a method in accordance with one embodiment of the present invention.

Various aspects of the present invention may be more fully understood with reference to FIGS. 1–3. FIG. 1 shows a digital television system that includes a video capture module 12, an MPEG2 video encoder 14, digital audio/video storage 20, a digital video retrieval module 22, a zoom module 70, and a display 88. The video capture module 12 is, for example, a tuner that receives video inputs 34 and processes them to produce digitized video data 36. The audio capture module 16 also captures audio inputs 40 and processes them to produce digitized audio data 46. For example, the video capture module 12 processes video inputs from NTSC broadcasts, VCR outputs, etc. and converting them into digitized video data 36. The audio capture module 16, which produces digitized audio data therefrom, receives audio inputs 40. The video inputs 34 and audio inputs 40 are part of a program input that may be originated from a television broadcast, cable broadcast, satellite broadcast, VCR output, DVD output, or any audio/video analog signal.

The MPEG2 video encoder 14 receives the digitized video data 36 and encodes it into MPEG2 encoded video data 38. In addition to processing video data, audio data is processed. The MPEG audio encoder 18 converts the digitized audio data 46 into encoded audio data 44. The video capture module 12 may further optionally include one or more of a close-captioned encoder, a parental control encoder, and a copy protection encoder. Such a conversion is utilized in the All-in-Wonder product produced and manufactured by ATI Technologies.

The digital audio/video storage 20 stores the MPEG encoded video data 38 and the MPEG encoded audio data 44. The digital audio/video storage 20 contains a file management in a processing module (not shown) and a memory that provide write control information to the digital audio/video storage 20. The processing module may be a CPU (central processing unit) such as a stand-alone microprocessor, micro-controller, digital signal processor (DSP), central processing unit (CPU), a coprocessor, or any device that manipulates digital data based on operational instructions. The memory may be random access memory, cache memory, floppy disk memory, hard drive or hard disk memory, floppy drive or hard disk memory, zip drive memory, magnetic tape memory, DVD-RAM memory, and/or any device that stores digital information which can be read from and written to by the CPU.

In a third embodiment, the digital audio/video storage 20 is implemented in parallel with the Zoom module 70, and both the digital audio/video storage 20 and the Zoom module 70 receive the MPEG encoded audio data 44 and the MPEG encoded video data 38. When included, the digital audio/video storage 20 may be a portion of a file management system that stores the MPEG encoded audio data 44 and the MPEG encoded video data 38 in a storage medium or other an archiving module. The storage medium may be a hard drive of a personal computer, RAM of a personal computer, floppy disk, or any particular digital storage medium.

In a third embodiment, the digital audio/video storage 20 is implemented in parallel with the Zoom module 70, and both the digital audio/video storage 20 and the Zoom module 70 may be provided the MPEG encoded audio data 44 and the MPEG encoded video data 38 directly. When included, the digital audio/video storage 20 may be a portion of a file management system that stores the MPEG encoded audio data 44 and the MPEG encoded video data 38 in a storage medium or other an archiving module. The storage medium may be a hard drive of a personal computer, RAM of a personal computer, floppy disk, or any particular digital storage medium.

The digital video retrieval module 22 receives the MPEG2 encoded video data 38 and the MPEG encoded audio data 44, and provides the MPEG2 encoded video data 38 and the MPEG encoded audio data 44 to the zoom module 70. The digital video retrieval module 22 is, for example, an MPEG2 video/audio decoder that includes a processing module 30 and memory 32.

The processing module 30 may be a CPU (central processing unit) such as a stand-alone microprocessor, microcontroller, digital signal processor (DSP), central processing unit (CPU), a coprocessor, or any device that manipulates digital data based on operational instructions. The memory may be read only memory, random access memory, cache memory, floppy disk memory, hard drive or hard disk memory, floppy drive or hard disk memory, zip drive memory, magnetic tape memory, DVD memory, and/or any device that stores digital information which can be read from and written to by the CPU.

The digital video retrieval module 22 is operably coupled to receive the encoded video and produce a video component of the decoded program. The digital video retrieval module 22 may utilize an MPEG2 decoding scheme such that the encoded video is stored in an MPEG2 format and is decoded into an uncompressed video component. The zoom module 70 receives video data signals 52 from the digital video retrieval module 22. The video data signals 52 comprise a stream of video images, or video frames, that are presented in sequence on the display 88. The zoom module 70 presents the image on the display 88.

The video component is provided to a display 88. The display 88 may be a television, a monitor, a CRT, and/or a LCD display, and further includes one or more speakers that may include a preamplifier stage to amplify an audio component to provide the appropriate volume levels.

The elements of FIG. 1 may be implemented as separate processing modules having associated memories or as a single processing module having an associated memory. Such a processing module may be a single processing device or a plurality of processing devices. A processing device may be a microprocessor, a microcontroller, digital signal processor, state machine, logic circuitry, and/or any device that manipulates signals (analog or digital) based on operational instructions. The associated memory(ies) stores the operational instructions executed by the corresponding processing module(s). Such a memory may be a single memory device or a plurality of memory devices. Such a memory device may be a random access memory, read-only memory, floppy disk memory, hard drive memory, and/or any device that stores digital information.

FIG. 1 depicts time shifting a picture by converting an analog television picture to a digital picture. However, the present invention is not limited to only systems that convert analog television pictures to digital pictures. The present invention is equally applicable to all digital systems such as cable set-top box systems and DVD players.

Figure 1A:
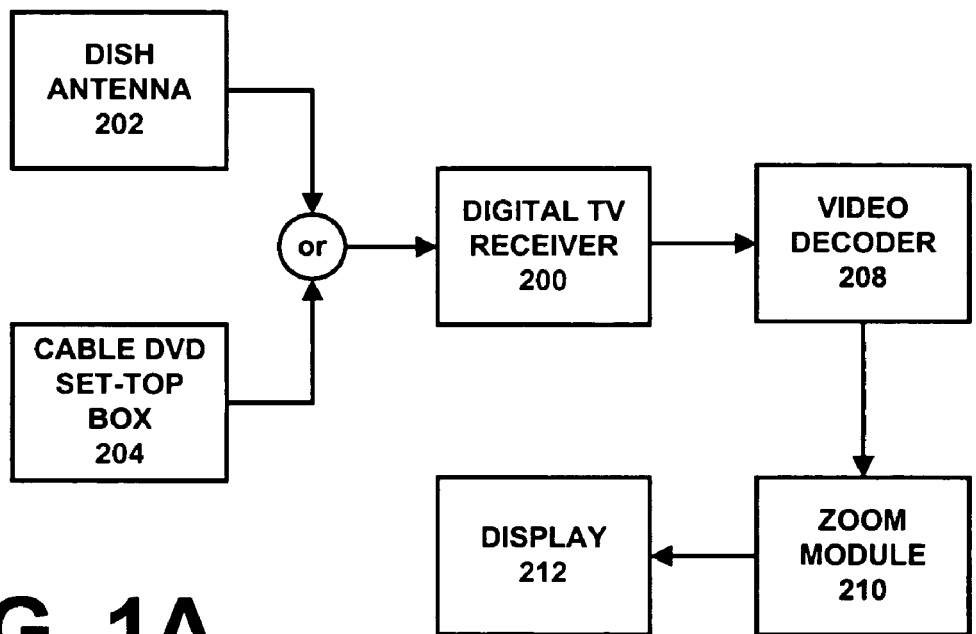
FIGS. 1A and 1B depict alternative embodiments that utilize zoom modules 210 and 308, respectively.

FIG. 1A is an alternative embodiment in which a digital television receiver 200 receives digital television signals from one of a dish antenna 202 or a cable DVD set-top box 204. The digital television receiver 200 is connected to a video decoder 208. The zoom module 210 is connected to receive the signals from the video decoder 208. As described above the zoom module 210 provides images to be displayed to the display 210.

Figure 1B:
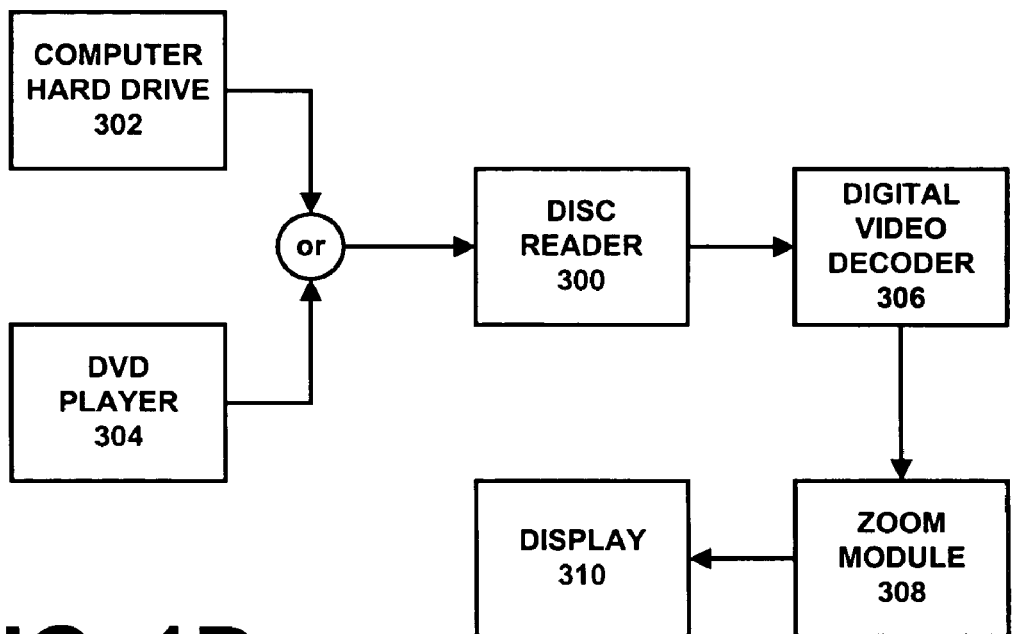

FIG. 1B is a anther alternative embodiment in which a disc reader 300 receives image signals from one of a computer hard drive 302 or a DVD player 304. The disc reader 300 sends digital signals to a digital video decoder 306, which decodes the digital signals. A zoom module 308 is connected to receive signals from the video decoder 306. As described above the zoom module 308 provides images to be displayed to the display 310.

FIG. 2 shows a full frame 102 and a zoom frame 112 that are examples of one situation that might arise during operation of the digital television system of FIG. 1. As stated previously, the video capture module 12 processes video inputs from NTSC broadcasts, VCR outputs, etc. and converting them into digitized video data 36. In the example shown in FIG. 2, the video inputs depict several automobiles 104–108 driving past a crowd 110 of onlookers.

It will be understood that the full frame 102 is merely a single frame of a sequence of frames that collectively comprise the digitized video data 36. The video inputs may, for example, be photographed by a cameraman who attempts to keep all of the automobiles 104–108 within the full frame 102. It will be understood that "photographed" may be interpreted as filmed, videotaped, or transmitted as a moving video image.

The cameraman may be located in a fixed position, and therefore "pans" the camera as the automobiles 104–108 move past the crowd. To pan the camera, the cameraman rotates or pivots the camera as the objects, in this case the automobiles 104–108, move. Because the cameraman does not have any particular interest in, for example, automobile 104, and merely intends to position or pivot the camera such that all the automobiles 104–108 remain within the frame, the cameraman may allow any particular automobile (such as automobile 104) to be located near an edge of the full frame 102. This may be particularly necessary as the angle of view between the automobile 104 and, for example, automobile 108, increases. The automobile 104 may be located near the left edge of the full frame 102, and the automobile 108 may be located near the right edge of the full frame 102.

The full image 102 is shown on the display 88, and fills the entire display 88. Accordingly, a user viewing the display 88 sees the automobiles 104–108 on the display 88. However, the user may be particularly interested in automobile 104. In other words, although the cameraman has photographed the automobiles 104–108, the user desires to "zoom" in on automobile 104.

Zooming is a well-known concept in video processing. A portion of the full image 102 is identified and enlarged to fill the entire display 88. The user can identify the portion of the full image 102 that is of particular interest via an input device such as a remote control, a keyboard, a mouse, a light pen, a laser pointer, a or touch screen. The user may select the portion of the display 88 by using the remote control. For example, the user may press "zoom" button on the remote control and then use a zoom-control portion of the remote control to select a zoom portion of the display 88. Alternately, the user may use a numeric portion of the remote control to indicate a zoom portion of the screen. Methods may be devised to designate the area to zoom using a standard remote control.

Another method of zooming is for the user to use a single button on the remote control to select the portion of the display 88 having a center coincident with the center of the display 88, such that the portion has zoom percentage programmed by the user via the remote control. For example, if the user enters a zoom percentage of 200%, the zoom module 70 determines that the user has selected a portion of the screen having a center coincident with the center of the display 88 and having a size equal to 50% (i.e., the reciprocal of 200%) of the display 88.

The user may also select from among a pre-defined set of portions of the display 88, such as a particular quadrant of the display 88. For example, a dedicated key on the remote control may allow the user to zoom onto a portion of the screen having a center coincident with the center of the display 88 and having a size equal to 50% (i.e., the reciprocal of 200%) of the display 88.

The zoom portion may be defined by three components: a horizontal position within the full frame, a vertical position within the full frame, and a size percentage (zoom factor) with respect to the full frame. For example, the position may be a distance from the left edge of the full frame and a distance from the top edge of the full frame. Alternatively, the zoom portion may be defined by a horizontal position and vertical position of a corner of the zoom frame 112 within the full frame 102, and a horizontal position and vertical position of an opposite corner of the zoom frame 112 within the full frame 102.

The zoom portion is initially represented on the display 88 as a transparent frame having visible edges. Regardless of how the zoom portion is defined, the user may then adjust the zoom portion to direct the zoom portion by altering its size and location on the full frame 102 shown on the display 88. In other words, although the full frame 102 is under the control of the cameraman, the zoom portion 112 within the full frame 102 is under the control of the user.

Once the user has selected a zoom portion 102, the zoom module 70 switches to a zoom mode. When in the zoom mode, the zoom module 70 displays only the zoom portion 112 on the display 88, enlarged as necessary to fill the display 88. As the user continues to view the zoom portion 112, however, the automobile 104 may move within the zoom portion 112. For example, if the cameraman redirects the camera to show the automobiles 104 and 106, and does not show automobile 108, then automobile 104 may be located closer to the center of the full frame 102. This is show in the second drawing of FIG. 2. However, as the automobile 104 moves within the full frame 102, the automobile 104 may no longer be completely contained within the zoom frame 112.

In accordance with one embodiment of the present invention, the zoom module 70 includes an MPEG2 motion detector that determines motion vectors within the zoom portion of the display 88. The MPEG2 motion detector decomposes each frame of the video stream into a plurality of discrete elements. The image elements are objects or persons shown in the image. For example, the image elements may include the automobile 104, the automobile 106, the automobile 108, and the crowd 110. Once the user has selected a zoom portion of the display 88, the zoom module 70 determines a compensated motion vector for each of the image elements in the zoom frame. The compensated motion vector, however, is not a motion vector as retrieved from the digital video retrieval module 22. Instead, the compensated motion vector is determined from a comparison of the zoom portion of the image with the full image as received from digital video retrieval module 22.

As shown in FIG. 2, the automobile 104 moves with respect to the full frame 102. The automobile 102 occupies a substantial portion of the zoom frame 112. Among all of the objects shown in FIG. 2, the automobile 104 has the largest motion vector. Accordingly, the motion vector associated with the automobile 104 is larger than the motion vector associated with any other object within the zoom frame 112. In accordance with one embodiment of the present invention, the zoom module 70 detects that the size, location, and motion vector of the automobile 104 will soon cause a portion of the automobile 104 to extend beyond the zoom portion 112. Accordingly, in accordance with one embodiment of the present invention, the zoom module 70 adjusts the zoom portion 112 such that the automobile 104 does not extend beyond the zoom portion 112.

The zoom module 70 performs this adjustment, in this example, by adjusting the horizontal position within the full frame, the vertical position within the full frame, and the size percentage (zoom factor) with respect to the full frame, or by adjusting the horizontal position and vertical position of a corner of the zoom frame 112 within the full frame 102 and the horizontal position and vertical position of the opposite corner of the zoom frame 112 within the full frame 102. The zoom module 70 also adjusts the zoom factor, where the zoom factor is a ratio of the area included within the zoom frame 112 and the area included within the full frame 102. The adjustment can be made continuously, as the automobile 104 moves within the zoom frame 112, or can occur abruptly as an edge of the automobile 104 approaches an edge of the zoom frame 112.

Moreover, in accordance with one embodiment of the present invention, as the camera pans past the crowd, the zoom module 70 determines a motion vector for objects within the full frame 102. The objects within the full frame 102 include objects within the zoom frame 112, but also include objects that are not within the zoom frame 112 and objects that are only partially within the zoom frame 112. The motion vectors of the objects within the full frame 102 are used to determine whether the camera is panning. For example, without panning, the automobiles 104–108 would have a large motion vector and would appear to move from left to right past the crowd 110, and the crowd 110 would have a very small motion vector. However, with panning (i.e., pivoting or other motion of the camera) to follow the automobiles 104–108, the automobiles 104–108 have a small motion vector, and the crowd 110 appears to have a large motion vector in the opposite direction. It is to be understood that the above described method uses motion vectors and MPEG2 has motion vectors built in. However, for non-MPEG2 content the motion vectors must be created.

It is desirable that the zoom frame 112 be adjusted to follow the automobile 104, and not be adjusted to follow the crowd 110. However, with panning, the crowd 110 had a larger motion vector than the automobile 104. Accordingly, when determining the compensated motion vectors for objects within the zoom frame 112, the zoom module 70 "subtracts" a motion vector of the full frame 102 taken as a whole. In other words, the zoom module 70 determines that a object (i.e., the crowd 110) has a large motion vector in one direction when observed in the full frame 102, and yet has a small motion vector when observed in the zoom frame 112. Accordingly, the zoom module 70 determines that the camera is panning past the crowd 110, and the crowd 110 is not moving past the camera.

It may happen that the adjustment of the zoom frame 112 itself would cause a portion of the zoom frame 112 to extend beyond an edge of the full frame 102. This is shown in the fourth picture of FIG. 2, in which the automobile 104 passes the automobile 106, and approaches the edge of the full frame 102. For example, the cameraman may slow the panning to follow the automobile 106, while the user may continue to have a particular interest in the automobile 104. In accordance with one embodiment of the present invention, when this occurs, the zoom module 70 cancels the zoom mode and returns to displaying the full frame.

FIG. 3 shows a method in accordance with one embodiment of the present invention. The method begins at step 116, when the zoom module 70 determines to begin a zoom mode. The zoom mode may be entered automatically, or in response to user input. At step 120, the zoom module 70 determines a zoom portion of the full image. The zoom portion may be defined by three components: a horizontal position within the full frame, a vertical position within the full frame, and a size percentage (zoom factor) with respect to the full frame. For example, the position may be a distance from the left edge of the full frame and a distance from the top edge of the full frame. Alternatively, the zoom portion may be defined by a horizontal position and vertical position of a corner of the zoom frame within the full frame, and a horizontal position and vertical position of an opposite corner of the zoom frame within the full frame. At step 130, the zoom module displays the selected portion (i.e., the zoom portion) on the display. At step 140, the zoom module detects motion of an object within the portion of the image. For example, the zoom module detects the compensated motion vector associated with the automobile 104 within the zoom frame. This optionally includes subtraction of a motion vector associated with the background. At step 150, the zoom module selects a second portion of the image. It will be recalled that a video image is actually a sequence of still frames presented rapidly so as to create an appearance of motion. Accordingly, the second portion of the image is simply a next zoom frame in a sequence. The second portion may have the same size and location with respect to the full frame as the first zoom frame, or may be adjusted with respect to the first zoom frame. The second portion may be adjusted continuously in response to the compensated motion vector of an object within the first zoom frame. If desired, the adjustments can be accumulated and delayed until the object nears an edge of the second portion of the image.

At step 160, the zoom module determines whether at least one edge of the second portion of the image extends beyond the full frame. Such a situation is shown in the fourth picture of FIG. 2. If at least one edge of the second portion of the image extends beyond the full frame, then the zoom module cancels the zoom mode. Optionally, at step 170, the zoom module determines whether a difference between the first portion of the image and the second portion of the image exceeds a predetermined threshold. In other words, the zoom module determines whether the zoom frame is moving too quickly across the full frame. If the zoom frame is moving too quickly across the full frame, then the zoom module cancels the zoom mode. Otherwise, the zoom module returns to step 130.

The method continues until interrupted the zoom state is terminated or there is no content being received. Optionally, the zoom state may be cancelled automatically by changes within the content itself, by commands from the user, or by various measurements with respect to the zoom frame exceeding various thresholds associated with the full frame.

It should be understood that the implementation of other variations and modifications of the invention in its various aspects will be apparent to those of ordinary skill in the art, and that the invention is not limited by the specific embodiments described. For example, the zoom module 70 may keep track of the motion of several objects, so that rather than canceling the zoom mode the zoom module 70 can instead switch to tracking a different object. It is therefore contemplated to cover by the present invention, any and all modifications, variations, or equivalents that fall within the spirit and scope of the basic underlying principles disclosed and claimed herein.

What is claimed is:

1. A method for providing a zoom video tracking image, comprising:
   beginning a zoom mode;
   receiving input data identifying a first zoom portion of full frame of an image;
   displaying the identified first zoom portion in a first zoom frame;
   detecting motion of an object within the first zoom frame;
   selecting a second zoom portion of a full frame of the image such that the object appears at least at a predetermined distance from an edge of the second zoom portion of the image; and
   displaying the second zoom portion in a second zoom frame.

2. The method of claim 1, further comprising, when at least one edge of the second zoom portion of the image extends beyond the full frame, terminating the zoom mode.

3. The method of claim 1, further comprising:
   measuring a difference between the first zoom portion of the image and the second zoom portion of the image; and
   when the difference between the first zoom portion of the image and the second zoom portion of the image exceeds a predetermined threshold, terminating the zoom mode.

4. The method of claim 1, wherein the first zoom portion of the image and the second zoom portion of the image are MPEG2 images; and wherein the detecting motion of the object within the first zoom frame includes examining MPEG2 motion vectors.

5. The method of claim 4, wherein, during panning of the image, objects within the full frame of the image have larger MPEG2 motion vectors than an MPEG2 motion vector of the object within the first zoom frame, and wherein the examining MPEG2 motion vectors includes determining a compensated MPEG2 motion vector for objects in the first zoom frame by eliminating an MPEG2 motion vector of the full frame of the image from the MPEG2 motion vector of the object in the first zoom frame.

6. The method of claim 4, wherein, during panning of the image, objects within the full frame of the image have larger MPEG2 motion vectors than an MPEG2 motion vector of the object within the first zoom frame, and wherein the examining MPEG2 motion vectors includes determining that an object has a larger motion vector in one direction when observed in a full frame of the image, and has a smaller motion vector when observed in a zoom frame in order to identify panning of the image.

7. The method of claim 1, wherein selecting the second zoom portion of the image includes selecting such that the object remains within the second zoom portion of the image.

8. The method of claim 1, wherein the object is a single object within the first zoom portion of the image.

9. A television system, comprising:
   a tuner operative to receive a video image;
   a video signal processor coupled to the tuner and operative to select a first zoom portion of a full frame of the video image to provide a selected first zoom portion of the video image; and the video signal processor also operative, while all edges of the selected first zoom portion of the video image are within the full frame of the video image, to zoom to the selected first zoom portion of the video image and display in a first zoom frame, to detect movement of an object within the first zoom frame, and to select a second zoom portion of the video image to redefine the selected first zoom portion of the video image and display in a second zoom frame.

10. The television system of claim 9, wherein the video signal processor is further operative to determine a difference between the first zoom portion of the video image and the second zoom portion of the video image, and to cancel zoom in response to the difference exceeding a predetermined threshold.

11. The television system of claim 9, wherein the first zoom portion of the video image and the second zoom portion of the video image are MPEG2 images; and wherein the video signal processor is further operative to detect motion of an object within the first zoom portion of the video image by examining MPEG2 motion vectors.

12. The television system of claim 11, wherein, during panning of the video image, objects within the full frame of the video image have larger MPEG2 motion vectors than an MPEG2 motion vector of the object within the first zoom portion of the video image, and wherein the video signal processor is further operative to determine a compensated MPEG2 motion vector for objects in the first zoom portion of the video image by eliminating an MPEG2 motion vector of the full frame of the video image from the MPEG2 motion vector of the object in the first zoom portion of the video image.

13. The television system of claim 11, wherein, during panning of the video image, objects within the full frame of the video image have larger MPEG2 motion vectors than an MPEG2 motion vector of the object within the first zoom portion of the video image, and wherein the video signal processor is further operative to determine that an object has a larger motion vector in one direction when observed in a full frame of the video image, and has a smaller motion vector when observed in a zoom frame in order to identify panning of the video image.

14. A method for providing a zoom video tracking image, comprising:
  receiving at least one full frame from a plurality of frames;
  beginning a zoom mode;
  receiving input data identifying zoom portion that includes only a portion of the at least one received full frame in response to beginning the zoom mode;
  displaying the zoom portion in a zoom frame in response to the receiving input data identifying the zoom portion;
  detecting motion of at least one object within the zoom portion in response to the receiving input data identifying the zoom portion; and
  adjusting a relationship of the zoom portion relative to the at least one full frame, such that the at least one object remains within the zoom portion in response to the detecting motion of the at least one object.

15. The method of claim 14, wherein the displaying the zoom portion includes displaying such that the zoom frame displays the at least one object while in motion.

16. The method of claim 14, including adjusting at least one of: a horizontal position and a vertical position of the zoom portion relative to the at least one full frame.

17. The method of claim 14, wherein detecting motion includes detecting motion for a single object within the zoom portion.

18. The method of claim 14, including adjusting a ratio of a zoom area included within the zoom portion and a full frame area included within the at least one full frame.

19. A method for providing a zoom video tracking image, comprising:
  beginning a zoom mode;
  receiving input data identifying a first zoom portion of a full frame of an MPEG2 image;
  displaying the identified first zoom portion in a first zoom frame;
  detecting motion of an object within the first zoom frame based on examining MPEG2 motion vectors and wherein, during panning of the MPEG2 image, objects within the full frame of the MPEG2 image have larger MPEG2 motion vectors than an MPEG2 motion vector of the object within the first zoom frame, and wherein the examining MPEG2 motion vectors includes determining a compensated MPEG2 motion vector for objects within the first zoom frame by eliminating an MPEG2 motion vector of the full frame of the MPEG2 image from the MPEG2 motion vector of the object within the first zoom frame;
  selecting a second zoom portion of a full frame of the MPEG2 image such that the object appears at least at a predetermined distance from an edge of the second zoom portion of the MPEG2 image; and
  displaying the second zoom portion in a second zoom frame.

20. A method for providing a zoom video tracking image, comprising:
  beginning a zoom mode;
  receiving input data identifying a first zoom portion of a full frame of an MPEG2 image;
  displaying the identified first zoom portion in a first zoom frame;
  detecting motion of an object within the first zoom frame based on examining MPEG2 motion vectors and wherein, during panning of the MPEG2 image, objects within the full frame of the MPEG2 image have larger MPEG2 motion vectors than an MPEG2 motion vector of the object within the first zoom frame, and wherein the examining MPEG2 motion vectors includes determining that the object has a larger motion vector in one direction when observed in the full frame of the MPEG2 image, and has a smaller motion vector when observed in the first zoom frame in order to identify the panning of the MPEG2 image;
  selecting a second zoom portion of a full frame of the MPEG2 image such that the object appears at least at a predetermined distance from an edge of the second zoom portion of the MPEG2 image; and
  displaying the second zoom portion in a second zoom frame.

21. A television system, comprising:
  a tuner operative to receive an MPEG2 video image;
  a video signal processor coupled to the tuner and operative to receive input data identifying a first zoom portion of a full frame of the MPEG2 video image and to display the identified first zoom portion in a first zoom frame;
  the video signal processor also operative to detect motion of an object within the first zoom frame by examining MPEG2 motion vectors;

the video signal processor further operative, wherein during panning of the MPEG2 video image, objects within the full frame of the MPEG2 video image have larger MPEG2 motion vectors than an MPEG2 motion vector of the object within the first zoom frame, to determine a compensated MPEG2 motion vector for objects within the first zoom frame by eliminating an MPEG2 motion vector of the full frame of the MPEG2 video image from the MPEG2 motion vector of the object within the first zoom frame; and the video signal processor further operative, while all edges of the identified first zoom portion are within the full frame of the MPEG2 video image, to zoom on the identified first zoom portion and display the identified zoomed first portion in the first zoom frame, to detect movement of the object within the first zoom frame, and to select a second zoom portion to redefine the identified first zoom portion and display the selected second zoom portion in a second zoom frame.

22. A television system, comprising:

a tuner operative to receive an MPEG2 video image;

a video signal processor coupled to the tuner and operative to receive input data identifying a first zoom portion of a full frame of the MPEG2 video image and to display the identified first zoom portion in a first zoom frame;

the video signal processor also operative to detect motion of an object within the first zoom frame by examining MPEG2 motion vectors;

the video signal processor further operative, wherein during panning of the MPEG2 video image, objects within the full frame of the MPEG2 video image have larger MPEG2 motion vectors than an MPEG2 motion vector of the object within the first zoom frame, to determine that the object has a larger motion vector in one direction when observed within the full frame of the MPEG2 video image, and has a smaller motion vector when observed within the first zoom frame in order to identify the panning of the MPEG2 video image; and the video signal processor further operative, while all edges of the identified first zoom portion are within the full frame of the MPEG2 video image, to zoom on the identified first zoom portion and display the identified zoomed first portion in the first zoom frame, to detect movement of the object within the first zoom frame, and to select a second zoom portion to redefine the first zoom portion and display the selected second zoom portion in a second zoom frame.

* * * * *